Patented Aug. 13, 1946

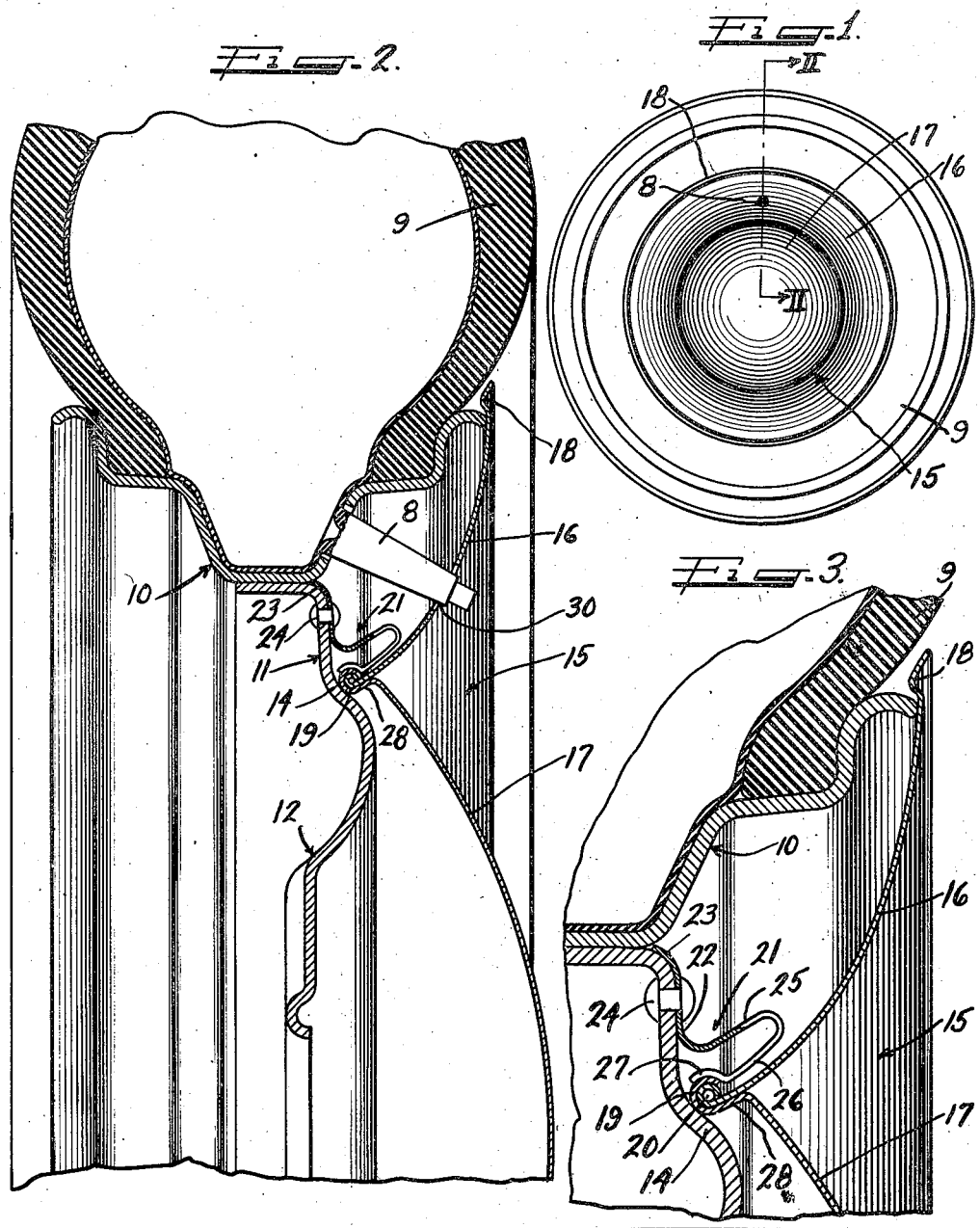

2,405,587

UNITED STATES PATENT OFFICE 2,405,587

WHEEL STRUCTURE

George Albert Lyon, Allenhurst, N. J.

Application April 10, 1944, Serial No. 530,353

4 Claims. (Cl. 301—37)

This invention relates to wheel trim and more particularly to a wheel structure wherein a wheel cover cooperates in a novel way therewith for retention on the wheel.

An object of this invention is to provide a multi-part wheel cover in which part may be plastic and part of metal and in which the parts cooperate in a novel way to perform functions made possible by the character of material used in the respective parts.

Still another object of this invention is to provide a novel attachment between two parts of a wheel cover, which attachment may be utilized in the retention of the cover on the wheel.

A further object of the invention is to so attach a plastic section to a metal section of a cover that the attachment permits of ready engagement of the parts and yet reinforces the cover at the area of attachment so as to provide a reinforced shoulder for engagement by a retaining means on a wheel.

Still another object of this invention is to provide in a wheel structure a novel retention for a wheel cover or trim.

In accordance with the general features of this invention there is provided in a wheel structure a wheel cover comprising a central hub cap portion having a curled outer edge and an outer annular plastic trim portion which has a turned inner edge snapped into nested relation with the curled edge of the hub cap portion so that said portions are held together as a unitary device with the edges arranged in the rear of the cover and forming an annular reinforced shoulder adapted to be engaged by cover retaining means on the wheel.

A still further feature of the invention relates to a cover of the foregoing character wherein the central hub cap portion may be made purposely more rigid than the outer annular portion, such as by making it of metal, and wherein the annular portion is so arranged and of such ornamental effect as to give a highly desirable appearance to the wheel when the cover is applied thereto.

A still further feature of the invention relates to the provision of spring clips in the wheel structure extending radially inwardly of the rim of the wheel and positioned for engaging the reinforced shoulder on the cover of the wheel so as to enable a snap-on retention of the cover on the wheel.

Other objects and features of this invention will more fully appear from the following detailed description taken in connection with the accompanying drawing which illustrates several embodiments thereof and in which, Figure 1 is a side elevation of a wheel structure having a cover embodying the principles of this invention;

Figure 2 is an enlarged fragmentary cross-sectional view taken on the line II—II of Figure 1 looking in a direction indicated by the arrows; and Figure 3 is an enlarged fragmentary cross-sectional view corresponding to a portion of Figure 2 except that the section is not taken at the valve stem and that the section is drawn to a larger scale.

As shown on the drawing:

The reference character 9 designates generally a conventional type of tire having the usual inner tube with a valve stem 8 and which is carried upon a drop centered tire rim 10 which, as is well known in the art, includes a multiple of side flanges connected by a base flange. The base flange of this rim 10 is attached to the usual shell like wheel body or spider 11 which may comprise a metallic stamping. The central part of this body 11 is depressed so as to form a wheel bolt-on flange 12 which, as is well known in the art, is adapted to be secured by means of cap screws, bolts or the like to a part on the vehicle such, for example, as the brake drum or the like. It should be noted that the wheel body 11 has a shouldered portion 14 which is adapted to define a seat for my novel wheel cover which I shall now describe and which is designated generally by the reference character 15.

The wheel cover 15 includes an outer annular portion or part 16 and a central hub cap portion 17. The outer annular portion 16 is preferably made of a resiliently flexible plastic material which is self-sustaining as to form. It may, for example, be made of ethyl cellulose. The material used, however, should possess sufficient body that it will resist permanent deformation upon indentation and yet may be manually flexible in use.

The central hub cap portion 17, however, should preferably be made of more rigid material. Relatively rigid plastic could be used for this portion but it is believed a more desirable ornamental effect can be obtained by making it of a metal sheet which lends itself to a lustrous external finish.

The outer annular portion or wheel trim 16 is of such radial depth as to completely conceal the exposed side flanges of the trim member of the wheel. The outer peripheral edge of the trim section 16 is offset radially rearwardly at 18 so as to overhang the outer edge of the rim in close proximity to the side wall of the tire. This feature, together with the particular cross-sectional configuration of the annular trim portion 16, enables this trim portion to appear to be a part of the side wall of the tire. Particularly is this true when the portion 16 is given a white finish on its outer surface, in which event it appears to constitute a white side wall part of the tire, wherein the tire is thus caused to appear to extend clear down to the hub cap portion 17. By reason of this arrangement the cover, when on the wheel, gives the illusion of the tire being a massive one and as having a white side wall which terminates at the central hub cap portion 17.

As best shown in Figure 3, the outer peripheral portion of the hub cap portion 17 is formed into an open sided curled edge 19 in which is received the turned inner edge 20 of the plastic trim portion 16. The edges 19 and 20 are of such diameters that the edge 20 may be snapped axially into the edge 19 by pressing it into the same, thus interlocking the two portions 16 and 17 together. This interlocking is in part made possible by reason of the flexible characteristics of the trim portion 16 which enables this inner edge 20 to be snapped the turned edge 19 on the metal hub cap portion 17. When thus joined together the two nested edges provide a reinforced annular shoulder which is of such diameter and arrangement at the rear of the cover as to be adapted to be pressed axially into retaining engagement with the spring retaining clips 21. These clips may be of any suitable number such, for example, as three or four and may, if it is so desired, be all part of a common strip. I preferably, however, make each of a separate construction and attach them at suitable intervals to the wheel body 11.

Each clip includes a base portion 22 having a curved extremity 23 adapted to follow closely the contour of the outer surface of the wheel body and terminating at the junction of the wheel body and the trim of the wheel. By having the extremity 23 formed in a curve it is possible, when the clip is secured to the body 11 by a rivet 24 or the like, to prevent twisting or turning of the clip on the fastening.

Each of the clips 21 also embraces a gooseneck portion 25 which is of flexible characteristic by reason of the clips being made of resilient steel. The gooseneck 25 includes a flexible free leg 26 terminating in a curved extremity 27 adapted to fit about the turned edge 19 when the cover is pressed into retaining engagement therewith as shown in Figure 3.

The clips are all identical in construction and are arranged in a common circle so that the turned edges 27 are in reality all in a common circle and in position to be engaged by the turned edge 19 of the wheel cover. Thus when the cover is pressed axially against the legs 26 of the clips, the clips will yield allowing the turned edge 19 of the cover to be cammed over the high points of each of the legs 26 and into retaining engagement with the curved extremities 27 of the clips. Since the clips, when the cover is retained thereby, are under tension it will be appreciated that the free legs 26 of the clips exert a radially inward force which forces the turned edge 19 of the cover tightly against the shouldered portion 14 of the wheel body so that the cover is held firmly against the wheel body.

The trim portion 16 is adapted to be flexed relative to the hub cap portion 17 and more particularly relative to an annular inclined shoulder or seat 28 formed on the hub cap portion 17 between the main body of the same and the turned edge 19. This seat 28 is inclined rearwardly and radially inwardly and facilitates the initial nesting of the edge 20 of the trim portion 16 inside the turned edge 19. In the event that a relatively long valve stem 8 is used or, in other words, one which would project beyond the trim section or portion 16, an opening 30 may be provided in the trim portion 16 so as to enable the valve stem to extend therethrough.

The cover may be easily removed by an operator manually gripping the turned edge 18 and prying the cover off of and free from a retaining engagement with the clips. In this process the portion 16 may be slightly flexed but inasmuch as this portion is so constituted that it acts to spring back to its original contour after flexure it will be appreciated that it will not be permanently deformed thereby.

A suitable pry-off tool, such as the end of a screw driver, may then be inserted behind the portion 16 so that a pry-off force may be applied to the reinforced edge 19 to eject the trim or cover from the clips 21. In addition, after the cover is on the wheel, should it be desired to get to the rear side of the trim portion 16, the same may be effected by pulling the edge 18 outwardly away from the wheel rim 10. Such access to the rear side of the section 16 may be necessary in some cases that where conventional wheel balancing weights are attached to the wheel rim in a manner now well known in the art. Sometimes it is necessary to have access to the balancing weights so as to readjust their positions on the rim.

Once the cover is in position on the wheel due to the fact that it is positively held against and backed up by the shouldered portion 14 of the wheel body it will be held in a relatively fixed position and will not tend to move in response to vibration or rotation of the wheel.

Should at any time either of the portions 16 or 17 become damaged in use either one may be replaced without necessitating the throwing away of the whole cover. This is possible due to the detachable manner in which the two portions 16 are held together in nested relationship.

I claim as follows:

1. In a wheel structure including a wheel having multi-flange tire rim and body parts, a wheel cover comprising a central hub cap portion for disposition over the body part and having a curled outer edge and an outer annular plastic trim portion for concealing outer side flanges of the rim part and having an inner edge snapped into nested relationship with said curled edge of the hub cap portion so that said portions are held together as a unitary device with said edges arranged to the rear of the cover and forming an annular reinforcing shoulder, and resilient clip means mounted on the wheel body part for retainingly cooperating with said shoulder in holding the cover on the wheel, said clip means comprising a plurality of clips each of which includes a base portion attached to the wheel body part and a flexible gooseneck portion with a turned extremity over and behind which the shoulder of the cover is adapted to be cammed, whereby the clips retainingly wedge the cover against the wheel.

2. In a wheel structure including a wheel having multi-flange tire rim and body parts, a wheel cover comprising a central hub cap portion for disposition over the body part and having a curled outer edge and an outer annular plastic trim portion for concealing outer side flanges of the rim part and having an inner edge snapped into nested relationship with said curled edge of the hub cap portion so that said portions are held together as a unitary device with said edges arranged to the rear of the cover and forming an annular reinforcing shoulder, and resilient clip means mounted on the wheel body part for retainingly cooperating with said shoulder in holding the cover on the wheel, said clip means comprising a plurality of clips each of which includes a base portion attached to the wheel body part and a flexible gooseneck portion with a turned extremity over and behind which the shoulder of the cover is adapted to be cammed, whereby the clips retainingly wedge the cover against the wheel, said base portion of each of said clips including a turned portion for embracing the wheel body part and for preventing turning of the clips relative to the wheel body part.

3. In a wheel structure including a wheel having multi-flange tire rim and body parts, said body part having an indentation adjacent said rim part and provided with an abutment a wheel cover comprising a central hub cap portion for disposition over the body part and having a curled outer edge and an outer annular plastic trim portion for concealing outer side flanges of the rim part and having an inner edge snapped into nested relationship with said curled edge of the hub cap portion so that said portions are held together as a unitary device with said edges arranged to the rear of the cover and forming an annular reinforcing shoulder, and resilient clip means mounted on said indentation of the wheel body part with their free extremities adjacent said abutment for retainingly cooperating with said cover shoulder in holding the cover against said abutment in said indentation, said outer annular plastic trim portion also having an outer edge offset rearwardly so as to over hang an edge of the rim part of the wheel in close proximity to the tire carried by the rim part.

4. In a wheel structure including a wheel having multi-flange tire rim and body parts, a wheel cover comprising a central hub cap portion for disposition over the body part and having a curled outer edge and an outer annular plastic trim portion for concealing outer side flanges of the rim part and having an inner edge snapped into nested relationship with said curled edge of the hub cap portion so that said portions are held together as a unitary device with said edges arranged to the rear of the cover and forming an annular reinforcing shoulder, and resilient clip means mounted on the wheel body part for retainingly cooperating with said shoulder in holding the cover on the wheel, said clip means comprising a plurality of clips each of which includes a base portion attached to the wheel body part and a flexible gooseneck portion with a turned extremity over and behind which the shoulder of the cover is adapted to be cammed, said wheel body part having a shouldered portion against which said shoulder of the cover is adapted to be pressed by said clip means to hold the cover in a tight fixed and centered position on the wheel.

GEORGE ALBERT LYON.